(12) United States Patent
Rittmann et al.

(10) Patent No.: US 10,066,670 B2
(45) Date of Patent: Sep. 4, 2018

(54) PLAIN BEARING COMPOSITE MATERIAL

(71) Applicant: FEDERAL-MOGUL WIESBADEN GMBH, Wiesbaden (DE)

(72) Inventors: Stefan Rittmann, Kirchheimbolanden (DE); Gerd Andler, Bad Schwalbach (DE); Maik Wilhelm, Ober-Olm (DE); Fabio Cosentino, Wiesbaden (DE); Berndt-Peter Reichl, Wiesbaden (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 93 days.

(21) Appl. No.: 14/651,017

(22) PCT Filed: Dec. 10, 2013

(86) PCT No.: PCT/EP2013/076011
§ 371 (c)(1),
(2) Date: Jun. 10, 2015

(87) PCT Pub. No.: WO2014/090764
PCT Pub. Date: Jun. 19, 2014

(65) Prior Publication Data
US 2017/0016480 A1 Jan. 19, 2017

(30) Foreign Application Priority Data
Dec. 13, 2012 (DE) .................. 10 2012 223 042

(51) Int. Cl.
*B32B 15/01* (2006.01)
*F16C 33/12* (2006.01)
(Continued)

(52) U.S. Cl.
CPC .......... *F16C 33/122* (2013.01); *B32B 15/012* (2013.01); *B32B 15/015* (2013.01);
(Continued)

(58) Field of Classification Search
None
See application file for complete search history.

(56) References Cited

U.S. PATENT DOCUMENTS 2,735,170 A 2/1956 Moffatt
2,809,422 A 10/1957 Schultz
(Continued)

FOREIGN PATENT DOCUMENTS

AT 511 196 A4 10/2012
DE 3938234 C2 5/1990
(Continued)

OTHER PUBLICATIONS

De Rosa et al., "Structural Properties of AlSn Thin Films Deposited by Magnetron Sputtering", Journal of Materials Science Letters 20, pp. 1365-1367, 2001.

*Primary Examiner* — Seth Dumbris
(74) *Attorney, Agent, or Firm* — Robert L. Stearns; Dickinson Wright, PLLC

(57) ABSTRACT

The invention relates to a plain bearing composite material, comprising a supporting layer (12) made of steel, a bearing metal layer (14) made of copper or a copper alloy, which is applied to the supporting layer (12), and a functional layer (16) made of aluminum or an aluminum alloy, which is applied to the bearing metal layer (14).

12 Claims, 2 Drawing Sheets

(51) Int. Cl.
  *C22C 21/00*   (2006.01)
  *C22C 9/02*    (2006.01)
  *C22C 9/04*    (2006.01)
  *F16C 33/10*   (2006.01)
  *F16C 17/02*   (2006.01)
  *F16C 33/20*   (2006.01)

(52) U.S. Cl.
  CPC ............... *C22C 9/02* (2013.01); *C22C 9/04* (2013.01); *C22C 21/003* (2013.01); *F16C 17/022* (2013.01); *F16C 33/109* (2013.01); *F16C 33/1095* (2013.01); *F16C 33/203* (2013.01); *F16C 2204/10* (2013.01); *F16C 2204/22* (2013.01); *F16C 2208/42* (2013.01); *F16C 2223/30* (2013.01); *F16C 2240/60* (2013.01); *F16C 2300/02* (2013.01); *F16C 2360/22* (2013.01); *Y10T 428/12736* (2015.01)

(56) References Cited

U.S. PATENT DOCUMENTS

| | | | | |
|---|---|---|---|---|
| 3,812,563 | A * | 5/1974 | Toaz | B22F 7/04 |
| | | | | 419/6 |
| 4,696,867 | A * | 9/1987 | Eastwood | C22C 21/003 |
| | | | | 148/438 |
| 5,209,578 | A * | 5/1993 | Eastham | C23C 14/16 |
| | | | | 384/276 |
| 5,304,006 | A * | 4/1994 | Ide | F16C 17/035 |
| | | | | 384/110 |
| 5,470,666 | A * | 11/1995 | Tanaka | C22C 21/003 |
| | | | | 384/912 |
| 5,766,777 | A * | 6/1998 | Tanaka | B32B 15/01 |
| | | | | 384/912 |
| 5,911,513 | A * | 6/1999 | Tsuji | F16C 33/124 |
| | | | | 384/276 |
| 6,163,961 | A * | 12/2000 | McMeekin | F16C 33/14 |
| | | | | 29/898.056 |
| 6,178,639 | B1 * | 1/2001 | Lytwynec | B32B 15/012 |
| | | | | 29/898.047 |
| 6,863,994 | B2 * | 3/2005 | Tanaka | B05D 5/08 |
| | | | | 384/276 |
| 2001/0006608 | A1 * | 7/2001 | McMeekin | C22C 21/003 |
| | | | | 420/537 |
| 2007/0031696 | A1 * | 2/2007 | Caspers | B32B 15/012 |
| | | | | 428/652 |
| 2007/0065067 | A1 | 3/2007 | Gartner et al. | |
| 2009/0245702 | A1 | 10/2009 | Kagohara et al. | |
| 2009/0297392 | A1 * | 12/2009 | McMeekin | C22C 21/00 |
| | | | | 420/530 |
| 2010/0068557 | A1 | 3/2010 | Andler | |
| 2013/0323524 | A1 * | 12/2013 | Andler | B32B 15/012 |
| | | | | 428/548 |

FOREIGN PATENT DOCUMENTS

| | | |
|---|---|---|
| DE | 3938234 C2 | 11/1990 |
| DE | 43 28 921 A1 | 4/1994 |
| DE | 4328921 A1 | 4/1994 |
| DE | 19963385 C1 | 1/2001 |
| DE | 10144126 C1 | 1/2003 |
| DE | 10246848 A1 | 5/2003 |
| DE | 10343618 B3 | 11/2004 |
| DE | 10 2005 023 308 A1 | 11/2006 |
| DE | 102005023308 A1 | 11/2006 |
| DE | 102005023541 A1 | 11/2006 |
| DE | 102005063325 B4 | 1/2008 |
| DE | 10 2005 063 324 B4 | 2/2008 |
| DE | 102005063324 B4 | 2/2008 |
| DE | 102008055194 A1 | 7/2010 |
| DE | 102009002442 A1 | 10/2010 |
| DE | 102011012086 A1 | 8/2011 |
| EP | 1522750 A1 | 4/2005 |
| EP | 1 764 522 B1 | 7/2009 |
| EP | 1764522 B1 | 7/2009 |
| EP | 2 105 518 A2 | 9/2009 |
| GB | 741 995 A | 12/1955 |
| GB | 1 073 428 A | 6/1967 |
| GB | 2 324 838 A | 11/1998 |
| GB | 2400420 A | 10/2004 |
| JP | H10299870 A | 11/1998 |
| JP | 2006283905 A | 10/2006 |
| JP | 2007092995 A | 4/2007 |
| JP | 2008540837 A | 11/2008 |
| JP | 2009228100 A | 10/2009 |
| JP | 2009228870 A | 10/2009 |
| WO | 2005066512 A1 | 7/2005 |
| WO | WO 2005/066512 A1 | 7/2005 |

\* cited by examiner

PLAIN BEARING COMPOSITE MATERIAL

BACKGROUND OF THE INVENTION

1. Technical Field

The present invention relates to a plain bearing composite material, a bearing shell made of such a plain bearing composite material, and a plain bearing made of two such bearing shells, which is primarily intended for internal use in engines of motor vehicles, primarily for connecting rod end bearings, crankshaft main bearings, and small-end bushings. Other applications are bearings for camshafts and balance shafts and for bearings in gears.

2. Related Art

Known composite materials have a steel back for a supporting layer, at least one bearing metal layer, and, in cases in which the bearing metal layer does not have adequate slide properties, have a cover layer or slide layer applied thereto. Plain bearings that have lighter loads are generally produced from composite materials having a steel supporting layer and an aluminum-based bearing metal layer, while plain bearings for heavier loads are produced from steel-bronze or steel-brass, that is, a copper-based bearing metal layer, because they generally have a higher fatigue strength than aluminum-based bearing metals.

Plain bearing composite materials made of steel-bronze or steel-brass composite materials are produced in that the bearing metal is cast or sintered onto the steel band. Production using plating is also known. In this case, first a solid bronze or brass band is produced and then, possibly after shaping and thermal treatment steps, it is added onto the steel band, generally by roll bonding.

Materials that contain lead are known for instance from DE 39 38 234 C2. The layer composite material described therein has selectively an aluminum-lead dispersion alloy cast onto a substrate or onto an intermediate layer applied to the substrate. The intermediate layer may itself be a high lead-content copper-lead-tin casting alloy, a copper-aluminum alloy, an aluminum-tin alloy, an aluminum-nickel alloy, or an aluminum-zinc alloy.

Since the use of lead is legally prohibited for reasons of toxicology, today the alloys used are almost exclusively lead-free bronze and brass alloys. Because of this, the machinability of the materials is not as good compared to the machinability of bronze and brass alloys that contain lead. Omitting the lead as a solid lubricant furthermore increases the tendency of the bearing metal to seize, which reduces the emergency operating properties of the bearing if said slide layer is used up. Therefore, these bearing metals are only used without an additional slide layer when the relative movements between plain bearing surface and opposing surface, e.g. in small-end bushings, are slow. The slide layer is needed at higher slide speeds. Since the slide layers are very thin, typically having a thickness of 50 to 20 µm, given direct contact with the opposing surface they would wear out rapidly and in addition offer little reserve for the embedding of dirt particles. Therefore sufficient lubrication for the gap must always be provided for in such plain bearings. Mixed friction conditions should therefore be avoided.

Lead-free bronze and brass composite materials are known for instance from DE 10 2005 023 308 A1, DE 10 2005 063 324 B4, DE 10 2005 063 325 B4, DE 10 2009 002 442 A1, DE 101 44 126 A1 and DE 10 2011 012 086 A1.

In contrast, a bearing metal based on aluminum provides better embeddability for dirt particles. The emergency operating properties of the aluminum bearing metals are also better, especially when they have high tin content. Therefore these materials may be used with and also without a slide layer. The aluminum-based materials are generally cast as a solid aluminum band and, after possible prior shaping and thermal treatment steps, are joined to a steel band, generally roll bonding.

Plain bearings made of composite materials having a bearing metal layer made of aluminum or an aluminum alloy are known for instance from DE 10 2005 023 541 A1, DE 102 46 848 A1, and DE 103 43 618 A1. The first two aforesaid documents discuss aluminum-tin alloys whose wear resistance and fatigue strength is somewhat improved with Si and other alloy constituent parts such as Zn, Cu, Mn, V, or Cr. The third document cited has as its subject matter an aluminum-zinc alloy for the bearing metal.

Considered for the slide layer, also called a coating or cover layer, are especially polymers, for instance applied as paint (see DE 10 2008 055 194 A1 and EP 1 522 750 A1), or thin metal layers applied chemically or electrochemically (galvanically) or by means of PVD methods, especially sputtering (see DE 199 63 385 A1, GB 2 400 420 A, DE 10 2005 063 324 B4, and DE 10 2005 063 325 B4). Many different material compositions are known for metal slide layers. For instance, they may have a tin-copper basis or a bismuth basis or an AlSn20 basis.

As a rule, the aforesaid coatings are applied during plain bearing production to the finished plain bearing. Applying the slide layer regularly increases the cost of producing these plain bearings, even significantly increasing these costs when using galvanic deposition of layers or when layers are applied by means of PVD methods. In addition, in many cases an intermediate or barrier layer is provided as a diffusion barrier between the bearing metal layer and the slide layer; it must also be deposited galvanically and further increases production process costs.

SUMMARY OF THE INVENTION

The object of the present invention is to provide a plain bearing composite material, a bearing shell, and a plain bearing that do not have the drawbacks described in the foregoing for both bearing metals, or have them only to a limited degree, especially a higher strength than steel-aluminum composite materials and reduced tendency to seize, high embeddability, and better machinability than lead-free steel-bronze or steel-brass composite materials. In addition, the plain bearing composite material should permit cost-effective production of plain bearings.

This object is attained using a plain bearing composite material comprising a supporting layer made of steel, a bearing metal layer made of copper or a copper alloy that is applied to the supporting layer, and a functional layer made of aluminum or an aluminum alloy that is applied to the bearing metal layer, wherein the functional layer is applied to the bearing metal layer using roll bonding and the aluminum alloy of the functional layer includes tin and, except for unavoidable impurities, is lead-free.

As stated in the foregoing, aluminum and especially aluminum alloys having an elevated tin content have a reduced tendency to seize compared to copper or lead-free copper alloys. Therefore the aluminum alloy of the functional layer contains tin and, except for unavoidable impurities, is lead-free.

A plain bearing material having a steel supporting layer, a bearing alloy layer based on copper, and a slide layer applied thereto that is based on aluminum, is known for instance from DE 43 28 921 A1, WO 2005/066512 A1, EP 1 764 522 B1, and from DE 10 2005 063 324 B4, which has already been cited. However, in these cases the slide layer is a sputter layer that only reaches a thickness of a few μm due to the application process.

In particular when there is adequate tin content in the aluminum alloy of the functional layer, the latter may therefore also provide the function of the slide surface. At the same time, however, it also has improved embeddability, and indeed not only compared to bearing metals made of copper or copper alloys, but also compared to the known slide layers due to its greater thickness.

The object is furthermore attained using a bearing shell made of a plain bearing composite material of the type described in the foregoing.

In the finished bearing shell, the functional layer preferably has a layer thickness of 5 to 500 μm, wherein the layer thickness may vary within this range depending on the specific application.

For instance, if the application requires very high fatigue strength, as is true for the connecting rod bearing shells in modern diesel engines, the functional layer in the bearing shell is designed as thin as possible, preferably 5 to 50 μm.

In the plain bearing composite material the functional layer preferably initially has a greater thickness because an excess of typically 100 to 200 μm must be taken into account that is required when the inner surface of the bearing shell shaped from a correspondingly thicker plate is to be shaped by means of machining, for instance by means of so-called shaped boring or reaming. Frequently a varying wall thickness is intentionally produced in the bearing shell in the circumferential direction in that the shaped boring is performed eccentrically to the outer circumference of the bearing shell. Since only the inner bearing metal layer is removed during machining, only its thickness varies, as well. The information regarding the thickness of the functional layer in the finished bored bearing shell in these cases always relates to the main load area. Depending on the eccentricity of the bearing bore, the thickness of the functional layer after machining is particularly preferably 5 to 30 μm for less eccentricity or even 20 to 50 μm for greater eccentricity in the main load area.

Machining only within the aluminum material or within the aluminum alloy has the advantage that the bearing metal layer made of copper or a copper alloy, which is generally more difficult to machine, remains untouched by machining. Because aluminum or the aluminum alloy, which may preferably also include an additional soft phase, such as e.g. tin, is easier to machine, on the one hand waste may be reduced and on the other hand the accuracy of the bores may be increased. In addition, the service life of the tools used for boring is increased.

If particularly high conformability and/or embeddability are required, such as is required e.g. for main bearings of modern gas engines, the functional layer is preferably designed thicker in the finished bearing shell. In this case the desired range of thickness is from 50 to 500 μm, particularly preferably 150 to 350 μm. In this case, as well, it should not be forgotten that the aluminum-based functional layer must not be too thick because otherwise the lack of fatigue strength of the aluminum-based bearing material will again be a factor, which fatigue strength due to the copper-based bearing metal layer disposed thereunder in any case could still be effectively compensated below the upper limiting value of 500 μm or 350 μm for bearings having a lighter load. Given these requirements, the supporting layer made of steel and the bearing metal layer absorb the forces and torques that occur during the operation of the plain bearing so that even the strength of a plain bearing made of the inventive plain bearing composite material is not inferior to the known bronze or brass bearing. In this case, as well, the consideration above regarding shaped boring and the excess required for this applies, so that for the inventive plain bearing composite material approximately 100 to 200 μm thicker layer thicknesses are to be provided if the bearing shell is to be machined subsequently.

In one advantageous embodiment the aluminum alloy of the functional layer includes impurities up to:
5-25 wt. % tin, preferably 10-20 wt. % tin;
1.5-3.0 wt. % silicon;
0.2-2.0 wt. % copper, preferably 0.4-1.5 wt. % copper;
0.2-1.5 wt. % manganese, preferably 0.3-1.0 wt. % manganese;
a total of a maximum of 0.4 wt. % and individually 0.2 wt. % of at least one element from the group vanadium, chromium, zirconium, and titanium, and
the rest aluminum.

The plain bearing composite material may be intentionally adjusted for the specific application using the selection of the alloys. Thus, for instance, the wear resistance may be increased by means of an elevated Si content.

In one preferred embodiment, the bearing metal layer is embodied as copper alloy layer that is lead-free except for unavoidable impurities. Since the bearing metal layer does not have to be machined, it is possible to do without the use of lead with no problem so that the inventive plain bearing composite material is safe in terms of toxicology. In the inventive plain bearing composite material, the poorer machinability compared to bronze containing lead or to a brass alloy containing lead is not a drawback. As an additional advantage of the invention, the adaptive clearance space increases due to the arrangement of two bearing metal layers.

Another advantage of the invention is based on the fact that the functional layer may be applied to the bearing metal layer using roll bonding.

The inventive plain bearing composite material makes it possible to use such joining methods, and thus continuous line production, without costly coating methods for the individual plain bearings that have already been shaped. Thus production of the plain bearings made of the inventive plain bearing composite material is simplified and more cost-effective.

It is preferred when the supporting layer and the bearing metal layer form a two-component composite, wherein the bearing metal layer is cast, sintered, or plated onto the supporting layer.

This can improve the production process. The two-component composite may be pre-finished as a band before the functional layer is applied thereto.

The bearing metal layer preferably has a layer thickness of 50 to 595 μm. The layer thickness of the bearing metal must be considered in conjunction with the layer thickness of the functional layer. In total, both bearing metal layers should preferably have a total bearing metal thickness of 200 to 600 μm and particularly preferably 300 to 500 μm, since when the layer thicknesses of the two bearing metal layers is greater there may be a reduction in the fatigue strength and when the layer thicknesses are lower the embeddability is negatively affected.

In some cases it is advantageous to apply another coating to the functional layer. With this coating or entry layer it is possible to further increase especially the wear resistance and the slide properties of the plain bearing made of the inventive plain bearing composite material so that the plain bearings provided with this coating may provide advantages in applications with particularly high slide speeds, while they are not required, however, for most of the applications cited at the beginning. Plain bearings having an additional coating are particularly suitable for applications in which there are frequently mixed friction conditions, such as is the case e.g. for stop-start conditions where stringent requirements are placed on the wear resistance of the bearing materials.

The coating is preferably a polymer lubricant lacquer. Lubricant lacquer shall be construed to mean a liquid or powder coating substance that includes filler for improving the slidability of the surface, that is applied in a thin coating to the functional layer, and that is embodied to become a continuous thin film using chemical or physical processes such as e.g. evaporating the solvent or curing by means of UV radiation. Preferably PAI (polyamide-imide), PI (polyimide), FBI (polybenzimidazole) and/or silicone resin are used for the polymers. The coating made of a polymer lubricant lacquer is characterized by high temperature and media resistance. Typically fillers such as iron oxide or a solid lubricant such as molybdenum sulfide, graphite, and hexagonal boron nitride (h-BN) are added to the synthetic resin matrix for reducing wear. Hard particles such as carbides, oxides, and/or nitrides may be used to increase wear resistance, as well.

The slide layers may be applied to the functional layer chemically or electrochemically in a known manner in order to intentionally adjust the slide properties in this manner. The primarily metal coatings are normally based on aluminum-tin, bismuth, and tin-copper compositions. However, the coating may also especially be a phosphatization.

The functional layer is preferably roughened. This improves the adhesion between the functional layer and the coating. The roughening may be provided by grit blasting or grinding the functional layer.

The present invention further relates to the use of a plain bearing composite material according to one of the embodiments discussed in the foregoing for producing plain bearing shells for plain journal bearings. The effects and advantages that result from this are the same as those that were discussed for the plain bearing composite material.

As is known, a bearing shell has a semi-circular profile. Two bearing shells made of a plain bearing composite material according to one of the aforesaid aspects are combined during installation to create a plain journal bearing that encloses the entire circumference of the opposing surface. The bearing metal layer of a first bearing shell of the plain bearing preferably has a layer thickness of 150 μm to 595 μm and the functional layer of the first bearing shell has a layer thickness of 5 μm to 50 μm. Furthermore, the bearing metal layer of a second bearing shell of the plain bearing has a layer thickness of 50 μm to 550 μm and the functional layer of the second bearing shell has a layer thickness of 50 μm to 500 μm, wherein the total bearing metal thickness, that is, the sum of the thicknesses of the functional layer and of the bearing metal layer, of the first bearing shell, and the total bearing metal thickness of the second bearing shell are essentially equal and preferably no more than 600 μm, particularly preferably no more than 500 μm, and very particularly preferably between 300 μm and 500 μm.

In terms of application technology, as with all bearings that are connected to the crankshaft in a combustion motor, there is a bearing side that is heavily loaded and a bearing side that has a lighter load. This is true for instance for connecting rod ends and also for crankshafts. The inventive embodiment of the plain bearing makes it possible to combine two different bearing shells within such a bearing position such that a heavily loaded bearing shell has a thinner functional layer made of aluminum or an aluminum alloy, while the more lightly loaded opposing shell of the same plain journal bearing has a thicker functional layer. In principle the thinner aluminum-based functional layer is advantageously located where high fatigue strength is required, while the thicker aluminum-based functional layer has better embedding behavior in order to thus reduce the sensitivity to dirt of the entire radial plain bearing. The bearing of the opposing surface requires that the total bearing metal thicknesses of the first bearing shell and of the second bearing shell are essentially equal. A shaped bore can ensure that the profiles and thus the wall thickness seen across the circumference vary by typically 10 μm to 20 μm. In the context of this document, total bearing metal thicknesses within this variation are essentially equal.

THE DRAWINGS

The invention shall be described in detail using preferred embodiments and referencing the attached drawings.

DETAILED DESCRIPTION

Figure 1:
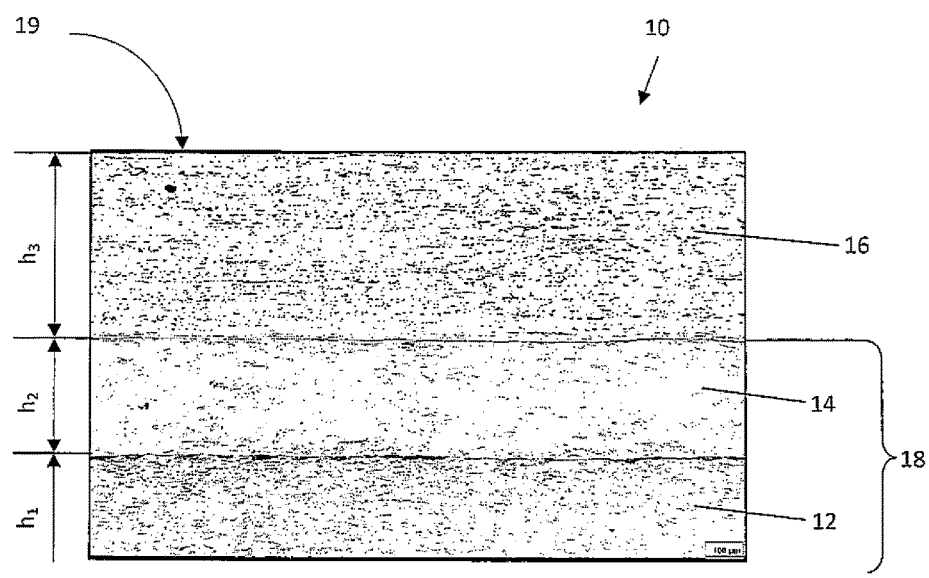
FIG. 1 depicts a first embodiment of an inventive plain bearing composite material.

The first embodiment of an inventive plain bearing composite material $10_1$ depicted in FIG. 1 includes a supporting layer 12, a bearing metal layer 14 with a copper basis that is applied thereto, and a functional layer 16 with an aluminum basis that is applied to the bearing metal layer 14. A plain bearing shell (not shown) is produced from the plain bearing composite material $10_1$ as part of a plain bearing. The supporting layer 12 and the bearing metal layer 14 form a two-component composite 18 that is produced for example by casting, sintering, or plating the bearing metal layer. The two-component composite 18 is then supplied for instance to a plating station for joining the functional layer. There the functional layer 16 is applied to the bearing metal layer 14, preferably using roll bonding.

The free surface of the functional layer 16 forms a slide surface 19 of a bearing element produced from the inventive plain bearing composite material 10. For instance a journal bearing (bush or bearing shell) may be produced from this composite material by shaping (bending or rolling) or a thrust washer may be produced from this composite material by punching. The supporting layer 12 is produced for instance from a tempering steel C22, the bearing metal layer 14 from a copper alloy of the CuNi2Si type, and the functional layer 16 from an aluminum alloy of the AlSn20 type.

The supporting layer 12 has a layer thickness $h_1$, the bearing metal layer 14 has a layer thickness $h_2$, and the functional layer 16 has a layer thickness $h_3$. Regardless of the rest of the layer structure, a steel band is used for the supporting layer 12, the layer thickness $h_1$ of which is between 900 and 1300 μm in the finished composite material. The layer thicknesses $h_2$ of the bearing metal layer 14 and $h_3$ of the functional layer 16 depend on the amount of stress on the bearing shell. Information on the preferred ranges may be found at the end of the description of the figures. In the example depicted in FIG. 1, the layer structure is designed in particular for improved conformability and embeddability of the finished bearing element.

Figure 2:
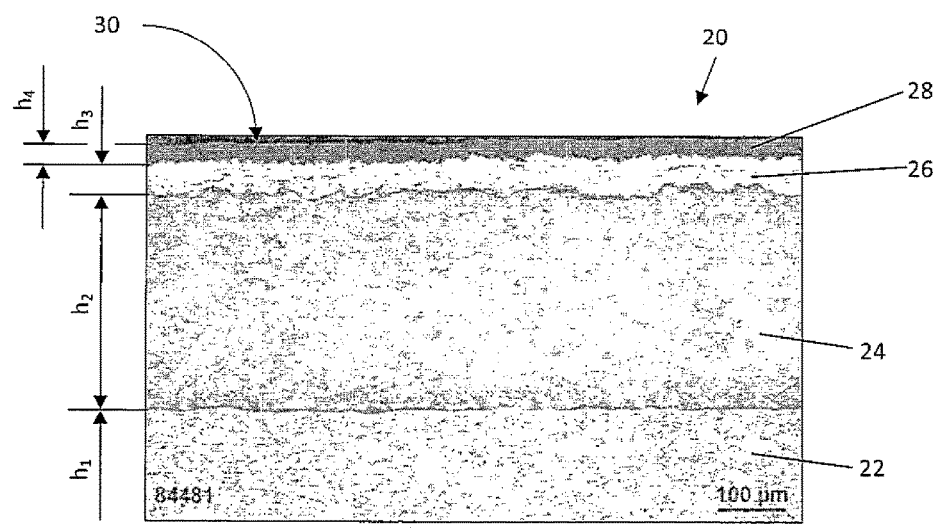
FIG. 2 depicts a second embodiments of the inventive plain bearing composite material; and, FIG. 3 depicts an embodiment of an inventive plain bearing.

FIG. 2 depicts a second embodiment of the inventive plain bearing composite material 20. The sequence of the supporting layer 22, bearing metal layer 24 with copper basis, and the functional layer 26 with aluminum basis is the same as that of the first exemplary embodiment. The thicknesses are different, however. While the supporting layer is produced from the same steel band and therefore has the same thickness, the bearing metal layer 24 has a significantly thicker layer thickness $h_2$ and the functional layer 26 has a significantly thinner layer thickness $h_3$ than in the first exemplary embodiment. This layer structure is designed especially for improved bearing strength and fatigue strength of the finished bearing element.

In addition, a coating or entry layer 28, in the example depicted a polymer lubricant lacquer that forms the slide surface 30 of a bearing element produced from the inventive plain bearing composite material 20, is applied to the functional layer 26. For improved adhesion of the polymer lubricant lacquer to the functional layer 26, the latter is roughened prior to the lubricant lacquer being applied. The polymer lubricant lacquer preferably has PAI (polyamide-imide) and includes fillers (not shown). The polymer lubricant lacquer has a layer thickness $h_4$ that is preferably between 5 and 20 μm.

Figure 3:
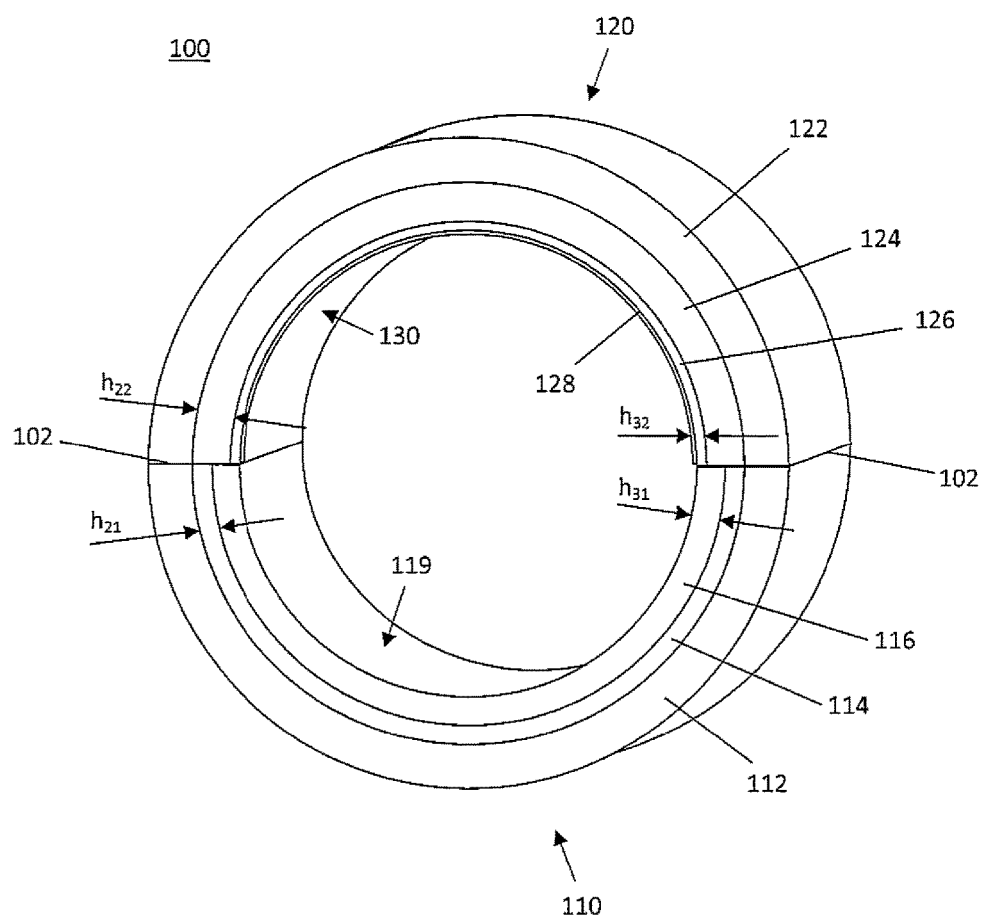

FIG. 3 illustrates an inventive plain journal bearing 100 that is made in a known manner from a first semicircular plain bearing shell 110 and a second semicircular plain bearing shell 120. So-called split lines 102 may be seen between the plain bearing shells 110 and 120. The first plain bearing shell 110 for instance forms the lower bearing shell of a connecting rod bearing and the second plain bearing shell 120 forms the upper bearing shell of the connecting rod bearing.

The first plain bearing shell 110 has, in approximately the layer structure of the plain bearing composite material 10 in accordance with the first exemplary embodiment, a supporting layer 112 made of steel, a somewhat thinner bearing metal layer 114 with a copper basis and a thickness $h_{21}$, and a somewhat thicker functional layer 116 with an aluminum basis and a thickness $h_{31}$. Therefore the first or lower plain bearing shell is in fact designed for lighter loads but improved embedding behavior.

The second plain bearing shell 120 has, in approximately the layer structure of the plain bearing composite material 20 in accordance with the second exemplary embodiment, a supporting layer 122 made of steel, a thicker bearing metal layer 124 with a copper basis and a thickness $h_{22}$, and a thinner functional layer 126 with an aluminum basis and a thickness $h_{32}$, to which an entry layer 130 has been applied. Therefore the second or upper plain bearing shell is designed for heavier loads, which is even further favored by the application of an entry layer.

Overall the thicknesses of the layers in the bearing shells for such a journal bearing preferably remain within the following ranges (at varying wall thicknesses, due to profiling, all figures in μm relate to the main load area, which is typically in the area of the apex of the bearing shell):

a) Bearing Shell with Higher Loads
  $900 \leq h_{11} \leq 1300$; preferably $1000 \leq h_{11} \leq 1200$
  $200 \leq h_{21}+h_{31} \leq 600$; preferably $300 \leq h_{21}+h_{31} \leq 500$
  $5 \leq h_{31} \leq 50$;
  $150 \leq h_{21} \leq 595$; preferably $250 \leq h_{21} \leq 495$
  optionally $5 \leq h_{41} \leq 20$ where $h_{11}$=layer thickness of the supporting layer, $h_{21}$=layer thickness of the bearing metal layer, $h_{31}$=layer thickness of the functional layer, and $h_{41}$=layer thickness of the optional entry layer b) Bearing Shell with Lighter Loads
  $900 \leq h_{12} \leq 1300$; preferably $1000 \leq h_{12} \leq 1200$
  $200 \leq h_{22}+h_{32} \leq 600$; preferably $300 \leq h_{22}+h_{32} \leq 500$
  $50 \leq h_{32} \leq 500$; preferably $150 \leq h_{32} \leq 350$
  $50 \leq h_{22} \leq 550$; preferably $100 \leq h_{22} \leq 350$ where $h_{12}$=layer thickness of the supporting layer, $h_{22}$=layer thickness of the bearing metal layer, and $h_{32}$=layer thickness of the functional layer.

One embodiment of the inventive plain journal bearing has the following layer thicknesses and tolerances (again in μm):

a) Bearing Shell with Higher Loads
  $h_{11}=1100\pm50$
  $h_{21}+h_{31}=400\pm50$
  $5 \leq h_{31} \leq 50$ b) Bearing Shell with Lighter Loads
  $h_{12}=1100\pm50$
  $h_{22}+h_{32}=400\pm50$
  $150 \leq h_{32} 300$ The ranges of values for $h_{21}$ and $h_{22}$ may be computed if 400 μm is assumed for the totals of the bearing metal layer thickness and functional layer thickness ($h_{2n}+h_{3n}$).

It may be seen from FIG. 3 and from the information provided above that the thickness of the supporting layers and the total bearing metal thickness of the functional layer and of the bearing metal layer for the upper and lower plain bearing shells are preferably selected to be equal. There are clear advantages for production. For one thing, the bands may be produced with the same thickness as intermediate products for both bearing shells, taking into account any excess. The shaping machines for shaping plates produced from the bands do not have to be changed over, because the thicknesses are the same. Finally, it is not necessary to change over the machine that is used to profile and machine the bearing shell to its final size. This is because both the intermediate product (re-shaped bearing shell) and the final product (profiled bearing shell) have the same overall thickness. Thus the plain bearing shells may be individually and optimally adapted to the various requirements depending on the installation position in the engine and combined to make a pair without significantly increasing the complexity of the machining.

The invention claimed is:

1. A plain bearing composite material, comprising
  a supporting layer (12) made of steel,
  a bearing metal layer (14) made of copper or a copper alloy that is applied to the supporting layer (12), and
  a roll bonded functional layer (16) made of an aluminum alloy that is applied to the bearing metal layer (14), and wherein the aluminum alloy of the functional layer contains tin and except for unavoidable impurities is lead-free and in that the bearing metal layer (14) has a layer thickness (h2) of 50 to 595 μm,
  wherein the aluminum alloy of the roll bonded functional layer consists of, except for impurities,
  5-25 wt. % tin,
  1.5-3.0 wt. % silicon,
  0.2-2.0 wt. % copper,
  0.2-1.5 wt. % manganese,
  a total of a maximum of 0.4 wt. % and individually a maximum of 0.2 wt. % of at least one element from the group vanadium, chromium, zirconium, and titanium, and the rest aluminum.

2. The plain composite material in accordance with claim 1 wherein the bearing metal layer (14) comprises a lead-free bronze or brass layer.

3. The plain bearing composite material in accordance with claim 1 wherein the supporting layer (12) and the bearing metal layer (14) form a two-component composite (18), wherein the bearing metal layer (14) is cast, sintered, or plated onto the supporting layer (12).

4. The plain bearing composite material in accordance with claim 1 wherein a coating (20) is applied to the functional layer (16).

5. The plain bearing composite material in accordance with claim 4, wherein the coating (20) is a polymer lubricant lacquer (22).

6. The plain bearing composite material in accordance with claim 4 wherein the coating (20) is applied to the functional layer (16) chemically, by means of spray lacquering, or electrochemically.

7. The plain bearing composite in accordance with claim 4 wherein the functional layer (16) is roughened.

8. A bearing shell made of a plain bearing composite material in accordance with claim 1.

9. The bearing shell in accordance with claim 8 wherein the functional layer (16) has a layer thickness (h3) of 5 μm to 500 μm.

10. The bearing shell in accordance with claim 8 wherein the bearing metal layer (14) and the functional layer (16) have a total thickness of 200 to 600 μm.

11. The plain bearing composite material in accordance with claim 1, wherein the aluminum alloy of the roll bonded functional layer includes 10-20 wt. % tin.

12. A plain bearing having a first bearing shell and a second bearing shell, the first bearing shell and the second bearing shell being made of a plain bearing composite material comprising a supporting layer (12) made of steel,
a bearing metal layer (14) made of copper or a copper alloy that is applied to the supporting layer (12), and
a roll bonded functional layer (16) made of aluminum alloy that is applied to the bearing metal layer (14), the aluminum alloy of the functional layer (16) contains tin and except for unavoidable impurities is lead-free, wherein the first bearing shell and the second bearing shell are combined to create a journal bearing, wherein the bearing metal layer (14) of the first bearing shell has a layer thickness (h21) of 150 μm to 595 μm and the functional layer (16) of the first bearing shell has a layer thickness (h31) of 5 μm to 50 μm;

wherein the bearing metal layer (14) of the second bearing shell has a layer thickness (h22) of 50 μm to 550 μm and the functional layer (16) of the second bearing shell has a layer thickness (h32) of 50 μm to 500 μm, and wherein the total thickness of the bearing metal layer and the functional layer of the first bearing metal layer and the total thickness of the bearing metal layer and the functional layer of the second bearing shell are essentially equal, wherein the aluminum alloy of the roll bonded functional layer consists of, except for impurities, 5-25 wt. % tin,
1.5-3.0 wt. % silicon,
0.2-2.0 wt. % copper,
0.2-1.5 wt. % manganese,
a total of a maximum of 0.4 wt. % and individually a maximum of 0.2 wt. % of at least one element from the group vanadium, chromium, zirconium, and titanium, and the rest aluminum.

* * * * *